US008218430B2

(12) United States Patent
Zhao

(10) Patent No.: US 8,218,430 B2
(45) Date of Patent: Jul. 10, 2012

(54) METHOD, DEVICE AND SYSTEM FOR PROTECTING MULTICAST TRAFFIC

(75) Inventor: Dahe Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 297 days.

(21) Appl. No.: 12/636,413

(22) Filed: Dec. 11, 2009

(65) Prior Publication Data
US 2010/0091648 A1    Apr. 15, 2010

Related U.S. Application Data

(63) Continuation of application No. PCT/CN2008/071208, filed on Jun. 5, 2008.

(30) Foreign Application Priority Data

Jun. 14, 2007 (CN) .......................... 2007 1 0108440

(51) Int. Cl.
*G01R 31/08* (2006.01)
(52) U.S. Cl. ........ 370/218; 370/221; 370/227; 370/228; 370/390; 370/395.31; 709/224; 709/239; 709/242
(58) Field of Classification Search ........................ None
See application file for complete search history.

(56) References Cited

U.S. PATENT DOCUMENTS

| | | | |
|---|---|---|---|
| 7,230,913 B1 | 6/2007 | Vasseur et al. | |
| 7,370,119 B2 | 5/2008 | Provine et al. | |
| 2003/0097438 A1* | 5/2003 | Bearden et al. | 709/224 |
| 2003/0223357 A1* | 12/2003 | Lee | 370/218 |
| 2004/0008694 A1 | 1/2004 | Guo | |
| 2005/0111351 A1 | 5/2005 | Shen | |
| 2007/0019646 A1 | 1/2007 | Bryant et al. | |
| 2007/0174483 A1 | 7/2007 | Raj et al. | |
| 2007/0242605 A1 | 10/2007 | Lei | |
| 2008/0101362 A1 | 5/2008 | Hu et al. | |

FOREIGN PATENT DOCUMENTS

CN    1466322 A    1/2004
(Continued)

OTHER PUBLICATIONS

Extended European Search in corresponding European Application No. 08757619.5 (May 17, 2010).
(Continued)

*Primary Examiner* — Jeffrey M Rutkowski
(74) *Attorney, Agent, or Firm* — Leydig, Voit & Mayer, ltd.

(57) ABSTRACT

A method, a device, and a system for protecting a multicast traffic in the field of mobile communication are provided. A backup path is set up for a path that needs to be protected. Route information of the backup path is pre-stored in an entry of a route table. When a failure of the path is detected, a traffic is switched from the failed path to the backup path. By setting up a unicast tunnel or a multicast tunnel as the backup path for a working path in the multicast in advance, and by adding a backup path port as an ingress port of an entry of the route table, it realizes to switch a data flow to the backup path at a forwarding layer without being detected by a user when the working path failure occurs, realizes a fast convergence, and does not influence a user experience, thereby effectively reducing the influence on the user experience when the failed path is restored in a point-to-multipoint service.

9 Claims, 6 Drawing Sheets

FOREIGN PATENT DOCUMENTS

| | | |
|---|---|---|
| CN | 1738288 A | 2/2006 |
| CN | 1741505 A | 3/2006 |
| CN | 1756184 A | 4/2006 |
| CN | 1852141 A | 10/2006 |
| CN | 101094175 A | 12/2007 |
| CN | 101094175 B | 6/2011 |
| WO | WO 2005/115099 A2 | 12/2005 |

OTHER PUBLICATIONS

State Intellectual Property Office of the People's Republic of China, Examination Report in Chinese Patent Application No. 2007101084409 (Dec. 11, 2009)

State Intellectual Property Office of the People's Republic of China, English Translation of Written Opinion of the International Searching Authority (Sep. 18, 2008) and Preliminary Report on Patentability (Dec. 17, 2009) in International Patent Application No. PCT/CN2008/071208.

International Search Report in corresponding PCT Application No. PCT/CN2008/071208 (Sep. 18, 2008).

Wu et al., "Backup VP Preplanning Strategies for Survivable Multicast ATM Network," Department of Electrical Engineering at National Chung Cheng University, 1997, Institute of Electronic and Electrical Engineers, Chiayi, Taiwan.

* cited by examiner

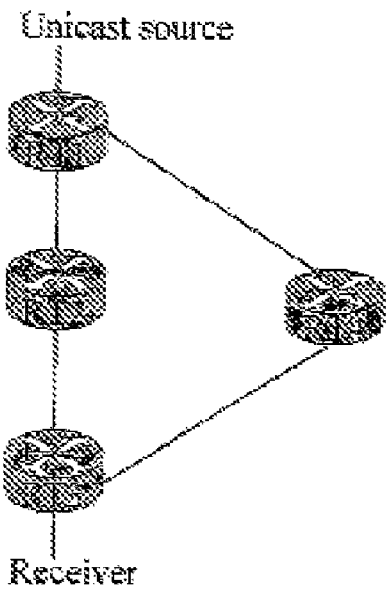

FIG. 3
(PRIOR ART)

A unicast tunnel is set up as a backup path for a path that needs to be protected in a multicast, and route information of the backup path is added to an entry of a route table. — 1

When one working path fails, an upstream node of the failed path detects the failure through a fast detecting mechanism, and immediately switches a data flow to the backup path for the failed path on a forwarding layer. — 2

After the unicast route protocol module acquires the network failure, another normal path to the downstream node is selected as a data forwarding path. — 3

After the unicast route protocol module acquires that the failed path is restored, the path between two nodes of the failed path is re-selected, and meanwhile a backup is set up for the failed path and is delivered to the forwarding layer to prevent another failure. — 4

FIG. 4

METHOD, DEVICE AND SYSTEM FOR PROTECTING MULTICAST TRAFFIC

CROSS-REFERENCE TO RELATED APPLICATIONS

This application is a continuation of International Patent Application No. PCT/CN2008/071208, filed Jun. 5, 2008, which claims priority to Chinese Patent Application No. 200710108440.9, filed Jun. 14, 2007, both of which are hereby incorporated by reference in their entireties.

FIELD OF THE INVENTION

The present invention relates to the field of communication technology, and more particularly to a method, a device, and a system for protecting a multicast traffic.

BACKGROUND OF THE INVENTION

The current Internet Protocol (IP) technologies have increasingly high requirements on the quality of service (QoS), for example, the voice over IP (VOIP) or IP television (IPTV) emphasizes a highly efficient service of a low delay, low jitter, and no packet loss. In order to satisfy the demands of end users, operators require the network devices to provide an excellent forwarding capability, which naturally imposes higher requirements on equipment suppliers.

When a network device fails or a physical link failure occurs in a terminal, the forwarding capability of the node or the link is lost, and the provided service is inevitably influenced to some extent. For an IP (Internet) phone, the influence on a user experience is disconnection. For an IPTV, the influence on the user experience is a pause of the program. Therefore, how to minimize the influence and improve the user experience becomes a technical problem to be solved urgently.

Taking a video service provided by the IPTV as an example, if the time for influencing the service is controlled to be approximately 50 milliseconds (ms) to 100 ms, the lost data is quite limited. Thus, the human eyes nearly cannot distinguish the difference, and no greater influence occurs. However, if the time for influencing the service reaches 5 seconds (s) to 10 s or even an interruption at a minute level occurs, the user possibly cannot endure a picture interruption for a long time, thereby influencing a user satisfaction rating on the service.

The IPTV needs to send data to a great number of users simultaneously from a video server, such that the forwarding operation needs to be optimized by using a multicast technology in a backbone network. Referring to FIG. 1, the server only sends a video traffic without setting up a great number of links with the users, and the network device replicates the traffic at points (cross-points) that need the replication.

A solution of processing a network failure in a conventional IP multicast technology is given as follows.

Referring to FIG. 2, firstly, a video traffic from a video server to a receiver reaches the receiver on the end of the network through RT1, RT2, and RT3. When RT2 fails due to certain reasons, firstly, the unicast routing protocol detects a change of the network topology, and reselects a path RT1, RT4, and RT3. Then, a multicast protocol depending on unicast starts to select a new path to forward the traffic. As the multicast is based on "reverse path forwarding (RPF)", RT3 initiates a traffic request to RT4, RT4 sends the traffic request to RT1, RT1 adds a new egress port for the traffic, and then the traffic is enabled to be forwarded to the receiver through the new path RT1, RT4, and RT3.

The time required from the occurrence of the failure to the traffic restoring equals the time required for finding out the topology change by the unicast routing protocol, plus the time required for re-calculating a path, plus the time required for initiating a traffic request by the multicast, plus the time required for adding an egress port by an upstream node. In the conventional art, even if the utmost possible optimization is performed, the total time at least reaches a second level, which causes a severe influence on the user experience. Therefore, the current IP multicast technique can only correctly replicate the traffic, but cannot satisfy the high quality and highly efficient routing demands.

Referring to FIG. 3, the multi-protocol label switching (MPLS) tunnel technology based on the unicast has been widely applied, so that all the technical solutions in the conventional art can only protect the point-to-point services, such that the applications thereof are restricted.

To sum up, the solution for processing the network failure in the conventional art can only protect the point-to-point unicast services, such that the applications thereof are rather limited. Furthermore, if the network failure occurs in the multicast service, only the traffic can be correctly replicated, but the high quality and highly efficient routing demands cannot be satisfied.

SUMMARY OF THE INVENTION

Various embodiments of the present invention provide a method, a device, and a system for protecting a multicast traffic, thereby reducing an influence on a user experience after a network failure occurs to a point-to-multipoint multicast service.

The present invention is implemented through the following technical solutions.

An embodiment of the present invention provides a method for protecting a multicast traffic. The method includes: setting up a backup path for a path that need to be protected and pre-storing route information of the backup path in an entry of a route table; and switching a traffic from the path to the backup path when a failure of the path is detected.

An embodiment of the present invention provides a device for protecting a multicast traffic. The device includes a backup path set-up unit, a status detecting unit, and a switching unit. The backup path set-up unit is configured to set up a backup path for a working path that needs to be protected in a multicast, and add route information of the backup path to an entry of a route table. The status detecting unit is configured to detect a working status of each path in the multicast. The switching unit is configured to perform a switching operation between the working path and the backup path when the status detecting unit detects a path failure in the multicast or detects that a failed path is restored.

In an embodiment, the present invention further provides a system for protecting a multicast traffic. The system includes a multicast source configured to deliver multicast data flows, a device for protecting a multicast traffic, and a plurality of forwarding nodes.

The device for protecting the multicast traffic is configured to set up a tunnel as a backup for a working path that needs to be protected in a multicast, detect a status of each path, and perform a path switching after a path failure occurs in the multicast, so as to control the plurality of forwarding nodes to transceive data flows from different ports.

The plurality of forwarding nodes is configured to forward the multicast data flows.

As known from the technical solutions in the embodiments of the present invention, by setting up a unicast tunnel or a multicast tunnel as a backup path for a working path in the multicast in advance, and by adding a backup path port as an ingress port of an entry of the route table, the present invention realizes to switch the data flow to the backup path at a forwarding layer without being detected by a user when the working path failure occurs, realizes a fast convergence, and does not influence the user experience, thereby protecting the point-to-multipoint service, and effectively reducing the influence on the service when the network partially fails.

BRIEF DESCRIPTION OF THE DRAWINGS

FIG. 3 is a schematic view of processing a unicast failure in the conventional art;

FIG. 4 is a flow chart of a first embodiment of the present invention;

DETAILED DESCRIPTION OF THE EMBODIMENTS

Figure 1:
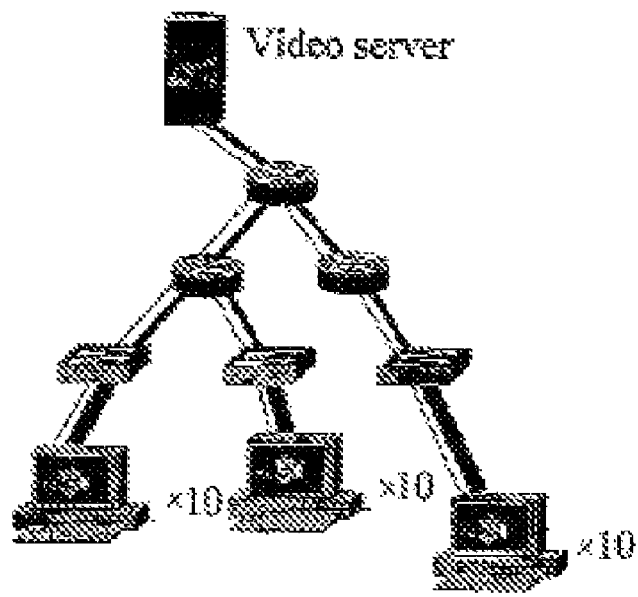
FIG. 1 is an architectural view of a multicast technology in the conventional art.
Figure 2:
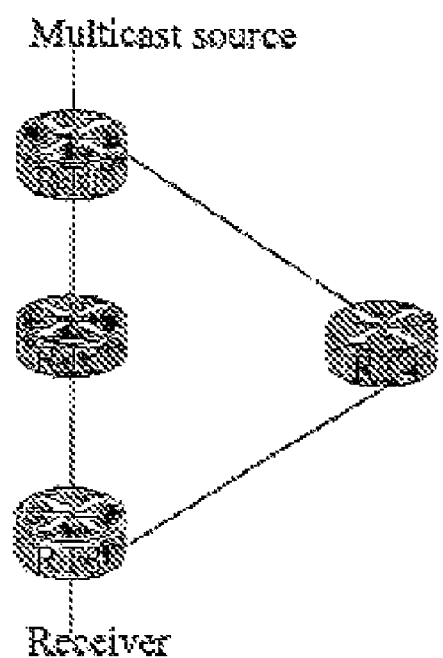
FIG. 2 is a schematic view of processing a multicast failure in the conventional art.

In the embodiments of the present invention, a multicast traffic is protected by using a unicast tunnel or a multicast tunnel as a backup path for the multicast traffic. When a network failure occurs, a forwarding layer automatically switches the multicast traffic to the backup path.

The solution of protecting the multicast traffic by using a unicast tunnel as the backup path for the multicast traffic and the solution of protecting the multicast traffic by using a multicast tunnel as the backup path for the multicast traffic are respectively described as follows in detail with reference to the accompanying drawings.

In the embodiment of the present invention, referring to FIG. 4, the solution of protecting the multicast traffic by using the unicast tunnel as the backup path for the multicast traffic includes the following steps.

In Step 1, a unicast tunnel or a multicast tunnel is set up as a backup path for a path that needs to be protected in a multicast, and route information of the backup path is added to an entry of a route table.

When the path that needs to be protected is a physical link, the unicast tunnel as the backup path may be a unicast IP tunnel, or a tunnel having an internal layer as a unicast IP tunnel and an external layer as an MPLS tunnel.

When the path that needs to be protected is an encapsulation tunnel, the unicast tunnel as the backup may be an encapsulation tunnel, in which, for example, a unicast IP tunnel is used and then the unicast IP tunnel is automatically protected by using an MPLS traffic engineering fast reroute (MPLS TE FRR) mechanism, so as to protect the multicast traffic.

The process of setting up the backup is described as follows.

Firstly, another egress port is designated as a backup port for an egress port of a current node. Another ingress port is designated as a backup port for an ingress port of a downstream node of the current node. Information about the backup ports is added to the route information. A path between the two backup ports is the backup path, and the information about the backup ports is the route information of the backup path.

In Step 2, when one working path fails, an upstream node of the failed path detects the failure through a fast detecting mechanism, for example, bi-directional forwarding detection (BFD), and switches a data flow to the backup path for the failed path on a forwarding layer. At this time, the control layer does not acquire a topology change, and the service is not interrupted. Furthermore, the backup ingress port is added as the ingress port of the entry of the route table, such that a downstream node of the failed path directly receives the data flow from the backup ingress port under a Reverse Path Forwarding (RPF) check.

In Step 3, after a unicast route protocol module acquires the network failure, the downstream node selects another normal path (a new forwarding path) as a data forwarding path, and sends a traffic request to the upstream node. The upstream node replicates the data flow to the normal path, and does not stop sending the data flow to the backup path. After receiving the data from the normal link, the downstream node considers that an upper layer protocol is converged, and the task of the backup path is finished, such that the downstream node sends a first prune packet from the backup port to the upstream node through the backup path. After receiving the prune packet, the upstream node stops sending the data flow to the backup port of the backup path, such that the data flow is stably transmitted on the normal link.

In Step 4, after the unicast route protocol module acquires that the failed path is restored, the downstream node of the failed working path initiates a traffic request to the upstream node through the restored working path. After receiving the request, the upstream node starts sending the data flow to the restored working path. Meanwhile, the backup path port is once again set as a backup for the failed working path port, and is delivered to the forwarding layer to prevent another failure, or a new backup is set up for the failed path. Meanwhile, a second prune packet is sent to the normal path selected during the path failure, and after receiving the prune packet, the upstream node stops replicating the data flow to the normal path, and the network is restored to a normal status.

An example of the embodiment is described in detail as follows with reference to the accompanying drawings.

Figure 5:
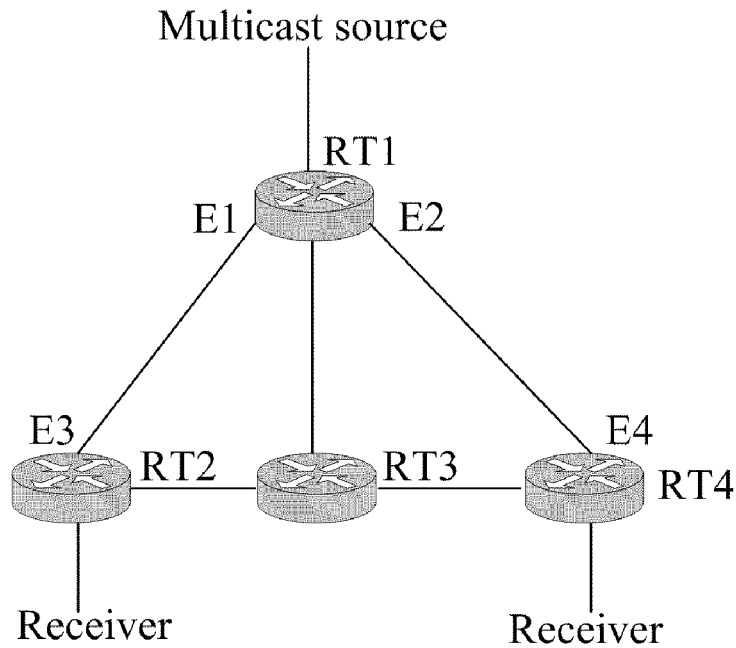
FIG. 5 is a view of a networking structure of a specific example according to the first embodiment of the present invention.

In a networking structure shown in FIG. 5, a multicast source sends data flows to two receivers in the network respectively through RT1 and RT2, and RT1 and RT4. A traffic is replicated at RT1 to two ports E1 and E2. According to an RPF principle of the multicast, RT2 only receives the traffic from E3, and RT4 only receives the traffic from E4 (the drawing is only a schematic view, and direct connection links, a plurality of devices, or a part of the network may exist between the routers shown in the drawing).

In Step 1, a backup path is set up for a multicast link, and a backup path port is added as an ingress port of an entry of a route table.

In a multicast forwarding process of an upstream device, a downlink replication of the traffic is realized depending upon an egress port list. Another port may be designated as a backup for a certain key egress port.

In a multicast forwarding process of a downstream device, the RPF check is performed according to the ingress port. If an ingress port of a traffic is not matched with an ingress port of the corresponding entry of a forwarding table, the traffic is discarded. Another port may be designated as a backup for a certain key ingress port.

A tunnel between the ports is the backup tunnel or backup path (which may be a one-to-one tunnel or a one-to-many tunnel).

Figure 6:
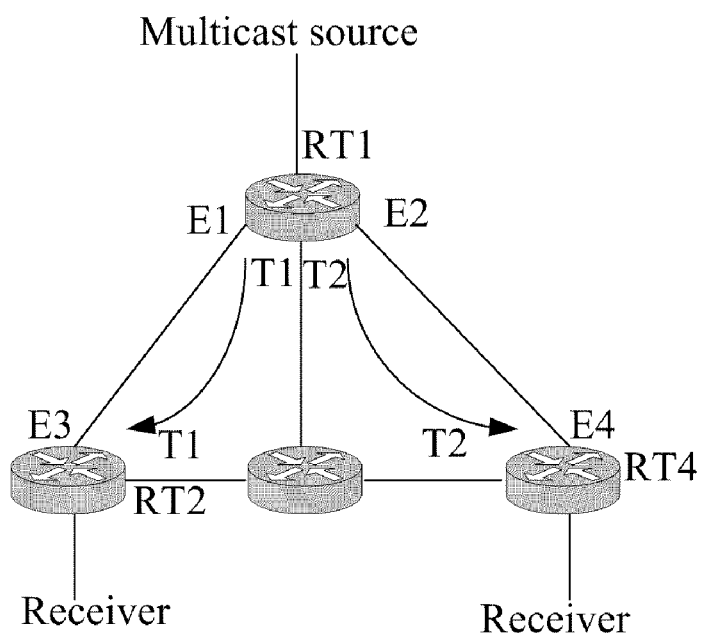
FIG. 6 is a schematic view of setting up a backup path in the networking structure shown in FIG. 5.

Referring to FIG. 6, in RT1, in order to protect the link E1-E3, a tunnel T1 is set up from RT1 to RT2 through RT3, and T1 is designated as a backup for E1. Similarly, in order to protect the link E2-E4, a tunnel T2 is set up from RT1 to RT4 through RT3, and T2 is designated as a backup for E2.

In RT2, the RPF principle of the multicast is modified. Specifically, a corresponding port of the backup path is added to an entry of the route table to serve as an ingress port. In this embodiment, if the ingress port of the entry of the route table is E3, T1 is further added as an ingress port of the entry, so that the traffic from E3 and the traffic from T1 are both received. Similarly, in RT4, the RPF principle of the multicast is modified, so that the traffic from E4 and the traffic from T2 are both received.

In Step 2, when a partial failure occurs, a service of the failed path is switched to the backup path.

Figure 7:
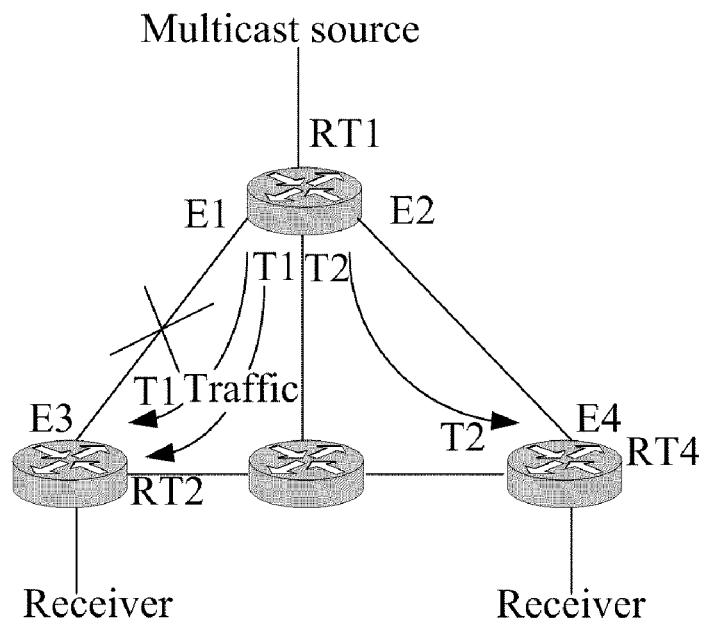
FIG. 7 is a schematic view when a partial failure occurs in the networking structure shown in FIG. 6.

Referring to FIG. 7, in RT1, when the E1-E3 link fails, a forwarding layer of RT1 quickly detects the failure through a fast detecting mechanism (for example, BFD), and finds that the data flow cannot be forwarded to E1, such that the traffic is immediately and automatically switched to the backup path T1 for the failed link at the forwarding layer. At this time, RT2 can also receive the traffic from T1, such that the control layer does not acquire a topology change, and the service is not interrupted.

In RT2, after the data flow is received from T1, as the ingress port includes T1, the RPF check is passed, and the data flow from T1 can be forwarded, without influencing the receiver.

In Step 3, after a routing protocol is converged, the data flow is stopped being replicated to the backup path, and the data flow is stably transmitted on a normal working path RT1-RT3-RT2 between RT1 and RT2.

Figure 8:
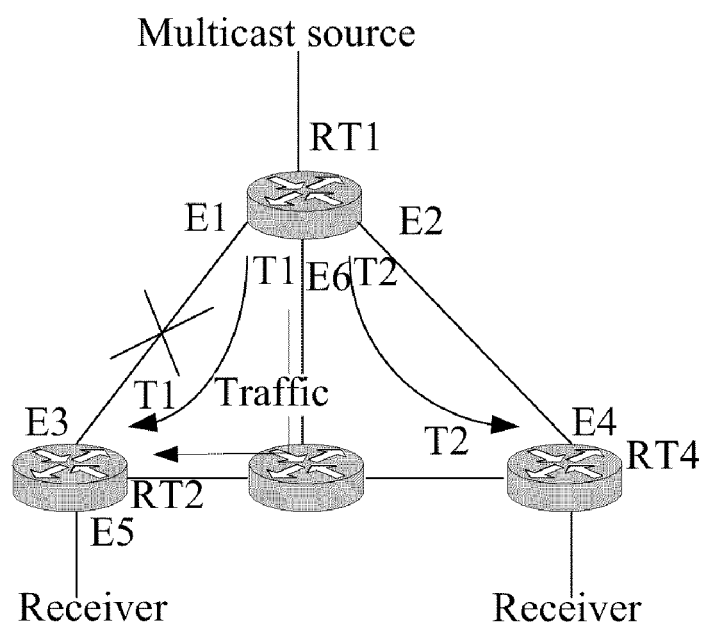
FIG. 8 is a schematic view of a process after a control layer acquires the failure in the networking structure shown in FIG. 7.

Referring to FIG. 8, after the data flow is transmitted on the backup path T1 for a period of time, the unicast route protocol module detects the network failure, and needs to select a normal working path RT1-RT3-RT2 between RT1 and RT2 to serve as a data forwarding path. Then, the multicast route protocol initiates a traffic request to the multicast source from a corresponding port on RT2, that is, a port E5, through the selected normal path. In RT1, after the traffic request is received from a port E6 corresponding to the selected normal path, the traffic is started to be replicated to the port E6. Meanwhile, the traffic is not stopped being replicated to the tunnel T1, so that a new traffic reaches RT2 (as two copies of traffic) through T1 and RT1-RT3-RT2 (non-tunnel) respectively.

In RT2, when it is detected that the data reaches from the port E5, RT2 considers that an upper layer protocol is converged, and the task of the backup path is finished, such that RT2 initiates a prune packet from the port T1, stops receiving the traffic from the port T1, and merely receives the traffic from the port E5. In RT1, when receiving the prune packet from the port T1, RT1 stops replicating the traffic to T1. Until now, the traffic is stably transmitted on the new link RT1-RT3-RT2 without influencing the receiver.

In Step 4, after the failed path is restored, a data flow forwarding path is re-selected, and the backup path is set.

Figure 9:
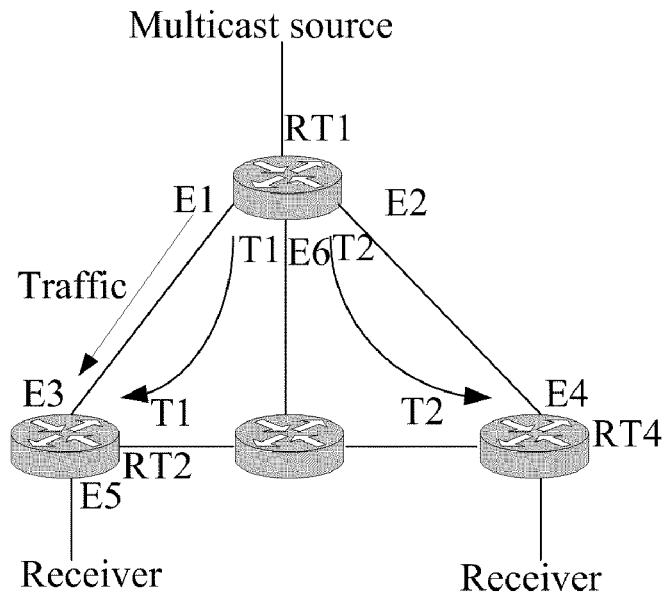
FIG. 9 is a schematic view after a failed path is restored in the networking structure shown in FIG. 8.

Referring to FIG. 9, after the E1-E3 link is restored, the unicast route protocol module in RT2 acquires that the network failure is restored, and re-selects the RT1-RT2 path, and then the multicast route protocol initiates a traffic request to the multicast source from the port E3.

In RT1, after the traffic request is received from the port E1, the traffic starts to be replicated to the port E1. Meanwhile, the port T1 is used as the backup of the port E1, and is delivered to the forwarding layer for preventing another failure.

In RT2, after the data is received from the port E3, an RPF port is set as E3. T1 and E3 are bound to be the backup path, so that T1 is also set as the RPF port, and a prune packet is sent to the port E5 (the former RPF port).

In RT1, when receiving the prune packet from the port E6, RT1 stops replicating the traffic to the port E6. At this time, the network is restored to a normal status, without influencing the service.

Figure 10:
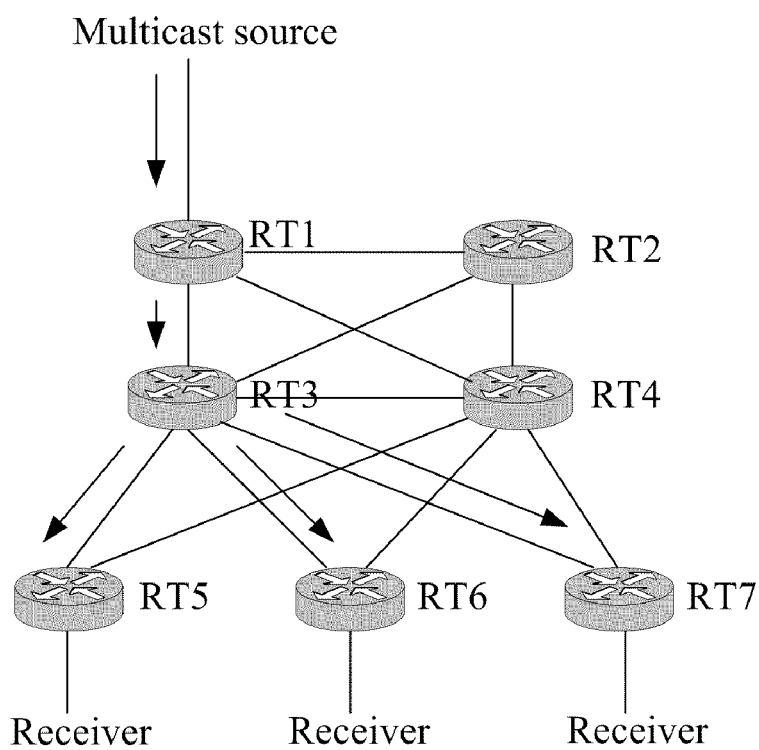
FIG. 10 is a view of a networking structure of a specific example according to a second embodiment of the present invention.

In a second embodiment of the present invention, a multicast traffic is protected by using a multicast tunnel as a backup path for the multicast traffic, and nodes bearing a great number of replication tasks in the multicast traffic are protected by using the multicast tunnels. Taking a networking structure shown in FIG. 10 as an example, it is a common multicast scenario deployed in a metropolitan area network (MAN). Access terminal devices (RT5, RT6, and RT7) are connected to upper layer devices through dual homing. A multicast traffic is planned to reach all the access devices through RT1-RT3. RT3 in the networking bears a great number of replication tasks, so that the failure of RT3 may cause an interruption of all the services for a certain period of time. A multicast fast restoring is realized by adopting the following solution.

Figure 11:
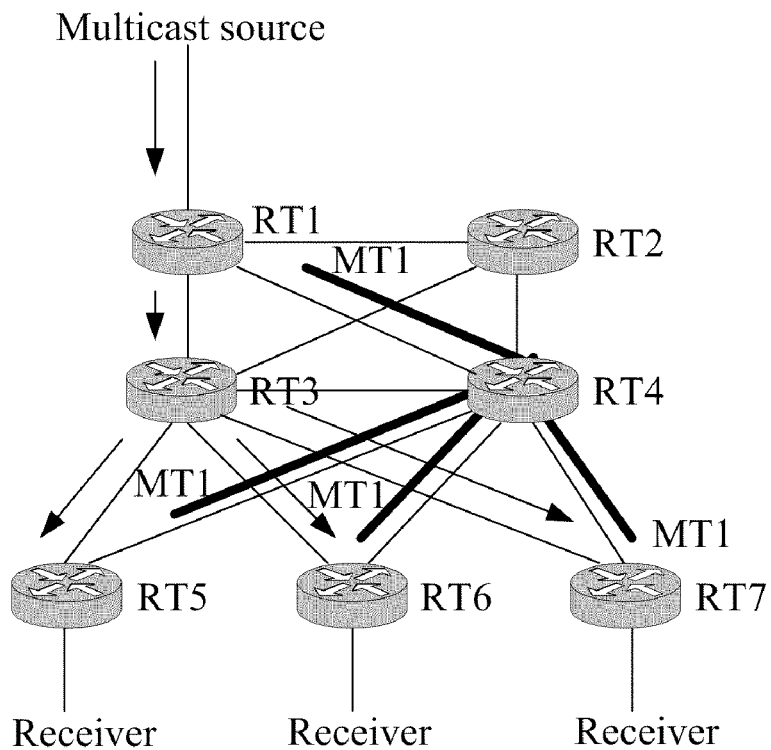
FIG. 11 is a schematic view of a multicast fast restoring solution in the networking structure shown in FIG. 10.

Referring to FIG. 11, a multicast tunnel MT1, having a source address as a device loop-back address and having a destination address designated as a backup group address, is set up in RT1. The tunnel MT1 is designated to be set up through RT4, and RT5, RT6, and RT7 are designated to be added to a backup group. MT1 is designated as a backup tunnel for RT3 in RT1. Similarly, once RT1 acquires that RT3 fails, by using the method according to the above embodiment, the multicast traffic is automatically switched to the multicast tunnel and reaches the access devices (RT5, RT6, and RT7). The access devices receive the data from MT1 and normally forward the data, so as to ensure that end users cannot detect the network failure.

The multicast tunnel as the backup may be an IP tunnel.

Figure 12:
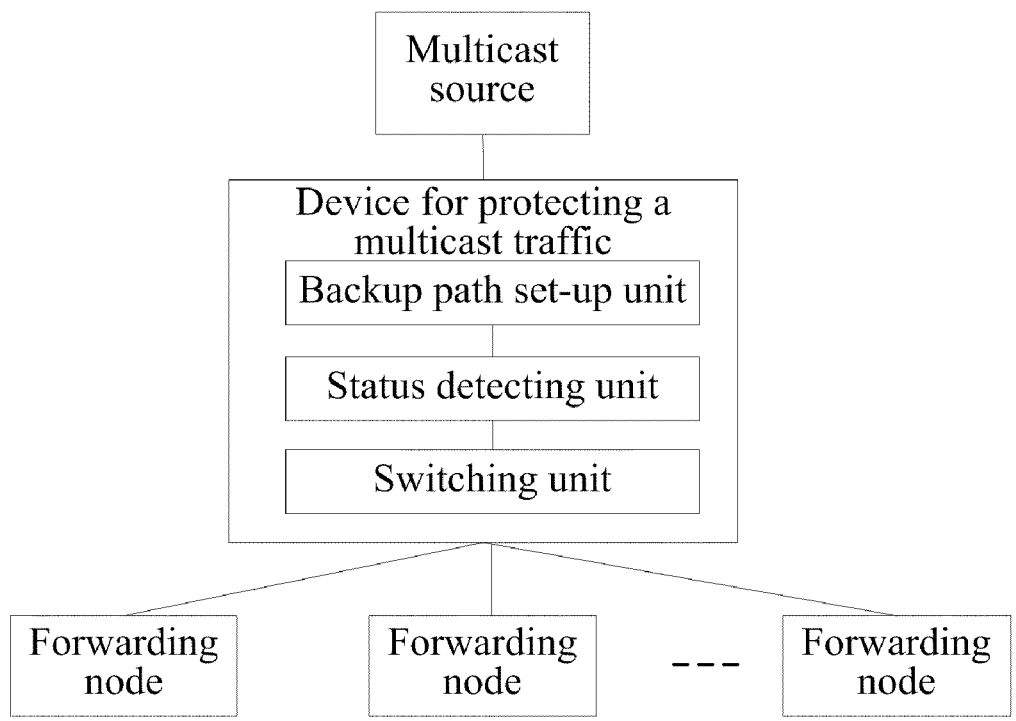
FIG. 12 is a schematic view of a system according to an embodiment of the present invention.

In an embodiment, the present invention provides a multicast fast restoring system. FIG. 12 is a schematic block diagram of a system according to an embodiment of the present invention. Referring to FIG. 12, the system includes a multicast source, a device for protecting a multicast traffic, and a plurality of forwarding nodes in a multicast.

The multicast source is configured to deliver multicast data flows.

The device for protecting the multicast traffic is configured to set up a tunnel as a backup for a working path that needs to be protected in the multicast, detect a status of each path, and quickly restore a multicast service when any path in the multicast fails. The specific functions thereof may be implemented by the following units, including a backup path set-up unit, a status detecting unit, and a switching unit.

The backup path set-up unit is configured to set up a tunnel as a backup path for a working path that needs to be protected in the multicast, and add a backup path port as an ingress port of an entry of a route table, in which the backup path may be a unicast tunnel or a multicast tunnel.

The status detecting unit is configured to detect a working status of each path in the multicast in real time.

The switching unit is configured to perform a switching operation between the working path and the backup path when the status detecting unit detects a path failure in the multicast or detects that a failed path is restored. The switching operation includes that when the status detecting unit detects a working path failure, a data flow is switched from the failed working path to a preset backup path, and when a control layer acquires the path failure, the data flow forwarded on the backup path is switched to another normal non-tunnel path between two nodes of the failed path, and after the status detecting unit detects that the failed path is restored, the data flow is switched back to the restored working path.

In order to finish the above functions, the backup path set-up unit further includes a backup port designating unit (not shown) and an information storage unit (not shown).

The backup port designating unit is configured to designate a backup port for a node on a multicast traffic path, in which information about the backup port is the route information of the backup path. The information storage unit is configured to add the information about the backup port designated by the backup port designating unit to the entry of the route table.

The switching unit further includes the following three modules (not shown), that is, a first switching module, a second switching module, and a third switching module.

The first switching module is configured to switch a data flow from a failed path to a preset backup path, when the status detecting unit detects a path failure in the multicast.

The second switching module is configured to switch the data flow from the backup path to another normal non-tunnel path between two nodes of the failed path, when the control layer acquires the path failure.

The third switching module is configured to switch the data flow from the normal non-tunnel path back to the restored path, when the failed path is restored.

Each unit of the device for protecting the multicast traffic may be set on each forwarding node in the multicast, so as to control each node to transceive data flows from different ports.

To sum up, in the embodiments of the present invention, by setting up a unicast tunnel or a multicast tunnel as a backup path for a working path in the multicast in advance, and by adding a backup path port as an ingress port of an entry of the route table, the resources are effectively utilized without influencing a network deployment, so as to switch the data flow to the backup path at a forwarding layer without being detected by the user when the working path failure occurs, realize a fast convergence, and not influence the user experience, thereby effectively reducing the influence on the user experience when the failed path is restored in the point-to-multipoint service.

The above descriptions are merely specific preferred embodiments of the present invention, but not intended to limit the present invention. Any modification or variation made by persons skilled in the art in the technical scope of the present invention shall fall within the protection scope of the present invention. The protection scope of the present invention is as defined in the claims.

What is claimed is:

1. A method for protecting a multicast traffic, comprising:
   setting up a backup path for a working path that needs to be protected, and pre-storing route information of the backup path in an entry of a route table;
   switching a multicast traffic from the working path to the backup path when a failure of the working path is detected;
   receiving a first traffic request from a downstream node through another normal path;
   replicating the multicast traffic to the normal path without stopping sending the multicast traffic to the backup path;
   receiving a first prune packet from the downstream node through the backup path and stopping sending the multicast traffic to the backup path;
   receiving a second traffic request from the downstream node through the working path after the working path restored;
   replicating the multicast traffic to the working path without stopping sending the multicast traffic to the normal path;
   receiving a second prune packet from the downstream node through the normal path and stopping sending the multicast traffic to the normal path; and
   wherein the setting up the backup path for the working path that needs to be protected, further comprises:
   designating a backup egress port as an egress port of a current node;
   designating a backup ingress port as an ingress port of the downstream node of the current node; and
   storing the backup egress port and the backup ingress port in the route information, wherein a path between the backup egress port and the backup ingress port is the backup path.

2. The method according to claim 1, wherein the switching the multicast traffic from the working path to the backup path when the failure of the working path is detected, further comprises:
   switching the multicast traffic from the working path to the backup path according to the pre-storing route information of the backup path in the entry of the route table when the failure of the working path is detected through a fast detecting mechanism, and making the downstream node of the failed working path receive the multicast traffic from the backup ingress port under Reverse Path Forwarding check.

3. The method according to claim 1, wherein the working path that needs to be protected comprises at least one of: a physical link and an encapsulation tunnel; and
   a unicast tunnel or a multicast tunnel is set up as the backup path for the working path that needs to be protected.

4. The method according to claim 3, wherein when the working path that needs to be protected is the physical link, the backup path comprises:
   (a) a unicast Internet Protocol (IP) tunnel,
   (b) a tunnel having an internal layer as a unicast IP tunnel and having an external layer as a multi-protocol label switching (MPLS) tunnel, or
   (c) a multicast IP tunnel;
   and
   when the working path that needs to be protected is an encapsulation tunnel, the backup path comprises: the encapsulation tunnel having the unicast IP tunnel protected by using an MPLS traffic engineering fast reroute mechanism.

5. The method according to claim 1, wherein the backup path is set as a backup for the restored working path, or a new backup path port is set up for the restored working path.

6. A device for protecting a multicast traffic, comprising:
a backup path set-up unit, configured to set up a backup path for a working path that needs to be protected in a multicast, and add route information of the backup path to an entry of a route table; wherein the setting up the backup path for the working path that needs to be protected, further comprises, designating a backup egress port as an egress port of a current node; designating a backup ingress port as an ingress port of a downstream node of the current node; and storing the backup egress port and the backup ingress port in the route information, wherein a path between the backup egress port and the backup ingress port is the backup path;
a status detecting unit, configured to detect a working status of each path in the multicast; and
a switching unit comprising a first switching module a second switching module and a third switching module, wherein,
the first switching module is configured to switch the multicast traffic from the working path to the backup path when a failure of the working path is detected;
the second switching module is configured to receive a first traffic request from a downstream node through another normal path, replicate the multicast traffic to the normal path without stopping sending the multicast traffic to the backup path, receive a first prune packet from the downstream node through the backup path and stop sending the multicast traffic to the backup path; and
the third switching module is configured to receive a second traffic request from the downstream node through the working path after the working path restored, replicate the multicast traffic to the working path without stopping sending the multicast traffic to the normal path, receive a second prune packet from the downstream node through the normal path and stop sending the multicast traffic to the normal path.

7. The device according to claim 6, wherein the backup path set-up unit further comprises:
a backup port designating unit, configured to designate a backup port for a node on a multicast traffic path; and
an information storage unit, configured to add information about the backup port designated by the backup port designating unit to the entry of the route table.

8. A system for protecting a multicast traffic, comprising: a multicast source configured to deliver multicast data flows, a device for protecting the multicast traffic, and a plurality of forwarding nodes, wherein
the device for protecting the multicast traffic is configured to set up a tunnel as a backup for a working path that needs to be protected in a multicast, detect a status of each path, and perform a path switching after a working path failure occurs in the multicast, so as to control the plurality of forwarding nodes to transceive data flows from different ports; wherein the setting up the backup path for the working path that needs to be protected, further comprises:
designating a backup egress port as an egress port of a current node; designating a backup ingress port as an ingress port of a downstream node of the current node; and storing the backup egress port and the backup ingress port in the route information,
wherein a path between the backup egress port and the backup ingress port is the backup path, wherein the performing the path switching after the working path failure occurs in the multicast, further comprises:
switching the multicast traffic from the working path to the backup path when a failure of the working path is detected, receiving a first traffic request from a downstream node through another normal path replicating the multicast traffic to the normal path without stopping sending the multicast traffic to the backup path, receiving a first prune packet from the downstream node through the backup path and stopping sending the multicast traffic to the backup path, receiving a second traffic request from the downstream node through the working path after the working path restored, replicating the multicast traffic to the working path without stopping sending the multicast traffic to the normal path, receiving a second prune packet from the downstream node through the normal path and stopping sending the multicast traffic to the normal path; and
the plurality of forwarding nodes is configured to forward the multicast data flows.

9. The system according to claim 8, wherein each unit of the device for protecting the multicast traffic is arranged on each forwarding node in the multicast.

* * * * *